Sept. 10, 1946.  M. HYMAN, JR  2,407,280
MOLD FOR USE IN THE MANUFACTURE OF OPTICAL ELEMENTS
Filed Sept. 2, 1942
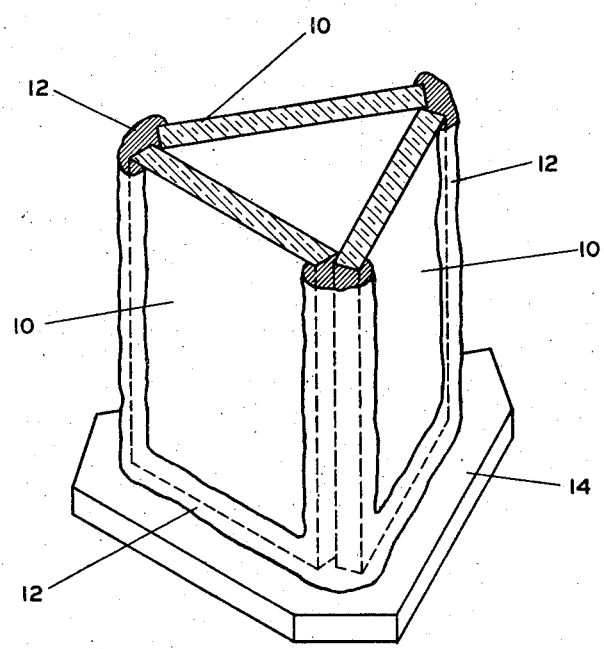
Mark Hyman, Jr.
INVENTOR.
BY Donald L. Brown
Attorney Patented Sept. 10, 1946

2,407,280

UNITED STATES PATENT OFFICE 2,407,280

MOLD FOR USE IN THE MANUFACTURE OF OPTICAL ELEMENTS

Mark Hyman, Jr., Cambridge, Mass., assignor to Polaroid Corporation, Cambridge, Mass., a corporation of Delaware Application September 2, 1942, Serial No. 457,031

5 Claims. (Cl. 18—39)

This invention relates to an improved mold for use in the manufacture of optical elements formed of polymerized synthetic plastics, resins and like materials.

An object of the invention is to provide a mold of the character described comprising a plurality of elements having optically smooth molding surfaces and a water-soluble cement for sealing the joints between said molding elements and holding them fixedly in position during the molding process.

Another object of the invention is the provision of a water-soluble cement which is resistant to temperatures at which the polymerization process takes place.

Other objects of the invention will in part be obvious and will in part appear hereinafter.

The invention accordingly comprises the product possessing the features, properties and relation of elements which will be exemplified in the following detailed disclosure and the scope of the application of which will be indicated in the claims.

For a fuller understanding of the invention reference should be had to the following detailed description, taken in connection with the accompanying drawing, which represents partially in perspective and partially in section one embodiment of the invention.

There is today a pressing demand for large quantities of optical elements, such as prisms, lenses and the like. This invention is concerned with the provision of molds adapted for use in the production of such elements from synthetic plastic or resinous materials which are introduced into the mold in a partially polymerized or monomeric state and then polymerized substantially completely and until they form hard, transparent optical elements. Materials which have been found particularly useful in the production of such molded plastic optical elements are cyclohexyl methacrylate, styrene, methyl methacrylate, and similar materials.

A considerable percentage of the cost of the molded optical element resides in the cost of the mold. The light-transmitting surfaces of the element are preferably molded in contact with glass elements having optically smooth surfaces, and these are expensive. It will be apparent that in the production of large quantities of molded optical elements it is highly desirable that the mold may be readily and rapidly assembled and that it should be easily removed from the finished article. It should comprise elements, and particularly those elements having optically smooth surfaces, which can be repeatedly re-used, and these elements should preferably be bonded together and maintained in proper position by an adhesive or a cement which may be readily applied, easily removed, and which will stand the temperatures to which the molds are subjected during the polymerization of the plastic material therein. With plastic materials of the class heretofore described polymerization temperatures are preferably maintained not greatly in excess of 90 degrees C.

This invention contemplates the use of a water-soluble and preferably a refractory cement as the material employed in sealing and bonding together the mold walls. The mold may be assembled by placing the glass wall elements in a suitable jig, and while they are held in position in the jig, for example by leaf springs or other means, they are sealed along their adjacent edges and cemented together by applying thereto the preferred adhesive or cement in the form of a thick paste. The cement may then be rapidly dried and it quickly sets and hardens.

The drawing illustrates in perspective a portion of a mold for use in the manufacture of prisms. The mold walls 10 are shown as made of glass, the preferred material, and they are bonded together and held in position by the water-soluble cement 12. A bottom plate 14 is also held in position by the cement 12.

A preferred material for use as the bonding material in the present invention is the refractory water-soluble cement sold under the trade name "Insalute." Other suitable cements may be employed. For example, a mixture of sodium silicate with a suitable filler, such as wood flour, pumice or the like has been found satisfactory. In this instance the filler acts primarily to prevent shrinkage of the sodium silicate as it hardens in contact with the mold walls and thus prevents strain and distortion thereof. Either of the cements described may be removed readily from the molds after the polymerization of the plastic therein has been completed by immersing the mold in water, as the cements are water-soluble. It is to be understood that other water-soluble cements which are adapted to withstand the molding temperatures may be used, and all such cements are to be deemed as falling within the scope of the invention.

It should perhaps be pointed out that with the use of water-soluble cements as bonding materials in molds employed for the purpose described, a preferred plastic material for use in connection with the production of the molded optical elements is one which shows very little water absorption when polymerized, and cyclohexyl methacrylate is to be preferred in this connection, as its water-solubility in the substantially completely polymerized state is extremely low. Other materials which may be satisfactorily employed in the production of molded optical elements in the manner described, and which are to be preferred when molds embodying the present invention are employed, because of the low water absorption of their polymers, are styrene, homologues of styrene, methyl cyclohexyl methacrylate, menthyl methacrylate, phenyl methacrylate and homologues of phenyl methacrylate.

Since certain changes may be made in the above product and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A mold for use in the formation of an optical element of polymerized synthetic plastic material or the like, comprising, in combination, a plurality of mold walls having molding surfaces substantially optically smooth, and a water-soluble cement bonding said walls together and comprising sodium silicate.

2. A mold for use in the formation of an optical element of polymerized synthetic plastic material or the like, comprising, in combination, a plurality of mold walls having molding surfaces substantially optically smooth, and a water-soluble cement bonding said walls together and comprising sodium silicate and a filler.

3. A mold for use in the formation of an optical element of polymerized synthetic plastic material or the like, comprising, in combination, a plurality of mold walls having molding surfaces substantially optically smooth, and a water-soluble cement bonding said walls together, said cement comprising also a water-insoluble filler.

4. A mold for use in the formation of an optical prism of polymerized synthetic plastic material or the like, comprising, in combination, a plurality of glass mold walls forming a prismatic mold cavity and having molding surfaces substantially optically smooth, and a water-soluble cement bonding said walls together and comprising sodium silicate.

5. A mold for use in the formation of an optical prism of polymerized synthetic plastic material or the like, comprising, in combination, a plurality of glass mold walls forming a prismatic mold cavity and having molding surfaces substantially optically smooth, and a water-soluble cement bonding said walls together and comprising sodium silicate and a filler.

MARK HYMAN, Jr.

Certificate of Correction

Patent No. 2,407,280. September 10, 1946.

MARK HYMAN, JR.

It is hereby certified that error appears in the printed specification of the above numbered patent requiring correction as follows: Column 4, line 33, after "filler." and before the signature to the specification insert the following claim—

> 6. A mold for use in the formation of an optical element of polymerized synthetic plastic material or the like, comprising, in combination, a plurality of mold walls having molding surfaces substantially optically smooth, and a water-soluble cement bonding said walls together, said cement comprising also a water-insoluble filler and showing substantially no contraction upon hardening.

and in the heading to the printed specification, line 8, for "5 claims" read *6 claims*; and that the said Letters Patent should be read with this correction therein that the same may conform to the record of the case in the Patent Office.

Signed and sealed this 22nd day of July, A. D. 1947.

[SEAL]

LESLIE FRAZER,
*First Assistant Commissioner of Patents.*